US012627100B2

(12) United States Patent
Brower et al.

(10) Patent No.: US 12,627,100 B2
(45) Date of Patent: May 12, 2026

(54) ELECTRICAL CONNECTOR WITH INTERLOCK

(71) Applicant: Hubbell Incorporated, Shelton, CT (US)

(72) Inventors: John Brower, Fairfield, CT (US); Zhenhong Li, Cheshire, CT (US)

(73) Assignee: Hubbell Incorporated, Shelton, CT (US)

( * ) Notice: Subject to any disclaimer, the term of this patent is extended or adjusted under 35 U.S.C. 154(b) by 340 days.

(21) Appl. No.: 18/533,814

(22) Filed: Dec. 8, 2023

(65) Prior Publication Data

US 2024/0195124 A1 Jun. 13, 2024

Related U.S. Application Data

(60) Provisional application No. 63/431,284, filed on Dec. 8, 2022.

(51) Int. Cl.

*H01R 13/639* (2006.01)
*H01R 13/66* (2006.01)
*H01R 13/713* (2006.01)

(52) U.S. Cl.

CPC ....... *H01R 13/639* (2013.01); *H01R 13/6683* (2013.01); *H01R 13/713* (2013.01)

(58) Field of Classification Search

CPC ......................... H01R 13/639; H01R 13/6683; H01R 13/713; H01R 13/6271; H01R 13/6275
USPC .................................................. 439/345, 352
See application file for complete search history.

(56) References Cited

U.S. PATENT DOCUMENTS

| | | | | |
|---|---|---|---|---|
| 7,766,702 | B2 | 8/2010 | DeFrance et al. | |
| 2001/0023037 | A1 | 9/2001 | Kieninger et al. | |
| 2006/0228923 | A1* | 10/2006 | Swift | G03G 21/1652 439/179 |
| 2008/0081516 | A1* | 4/2008 | Brandt | H02B 13/025 439/638 |
| 2021/0013726 | A1* | 1/2021 | Hill | B25F 5/00 |

FOREIGN PATENT DOCUMENTS

| | | |
|---|---|---|
| FR | 2465332 | 3/1981 |

OTHER PUBLICATIONS

International Search Report and Written Opinion in corresponding International Application No. PCT/US23/83108 mailed Apr. 10, 2024. (59 pages).

* cited by examiner

*Primary Examiner* — Gary F Paumen
(74) *Attorney, Agent, or Firm* — Wissing Miller LLP

(57) ABSTRACT

An electrical connector including at least one locking member movably engageable with at least one locking feature provided on a second electrical connector, at least one latch rotatably movable between a locked position for preventing movement of the at least one locking member and an unlocked position for allowing movement of the at least one locking member and a sensor for sensing a voltage level on the electrical connector, wherein when the voltage level is sensed to be above a defined level, the at least one latch is moved to the locked position and when the voltage level is sensed to be below the defined level the at least one latch is moved to the unlocked position.

21 Claims, 14 Drawing Sheets

Fig. 7A
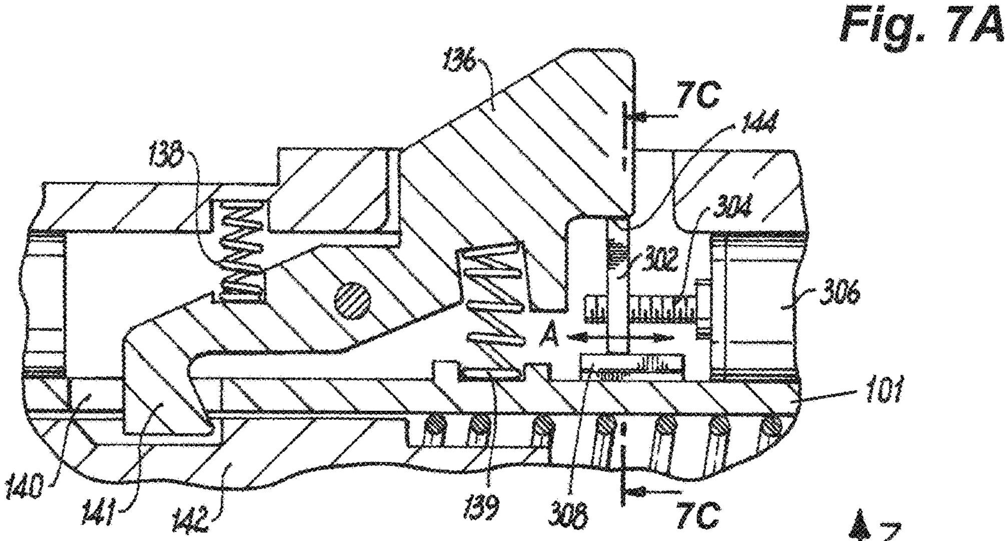
Fig. 7B
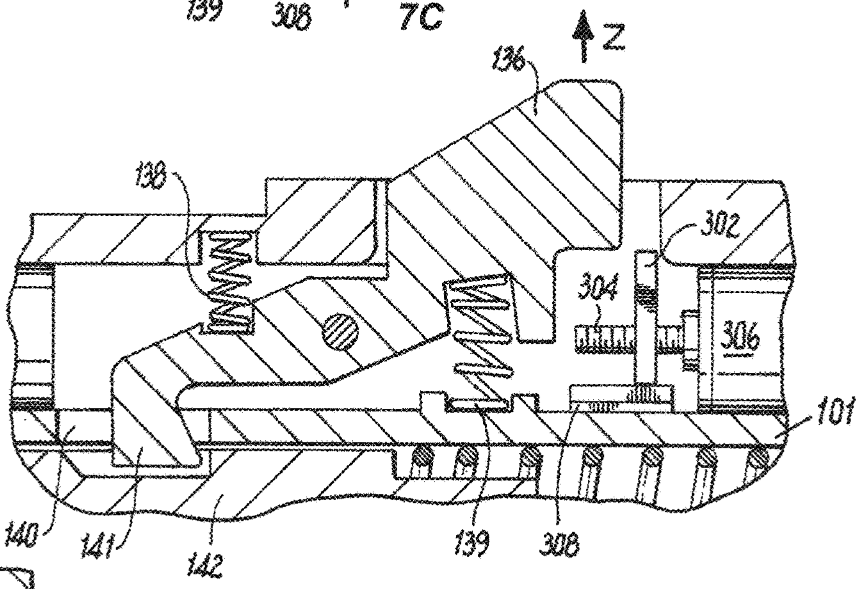
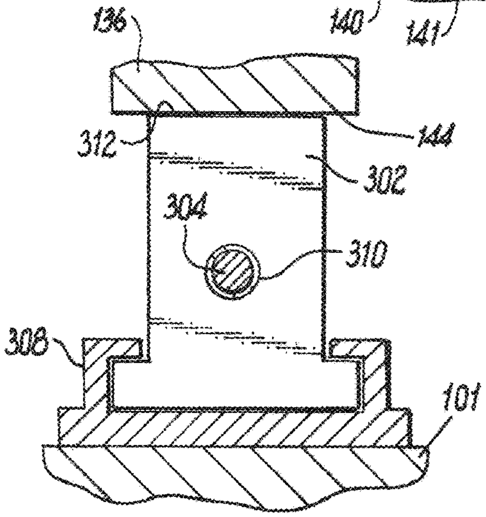
Fig. 7C

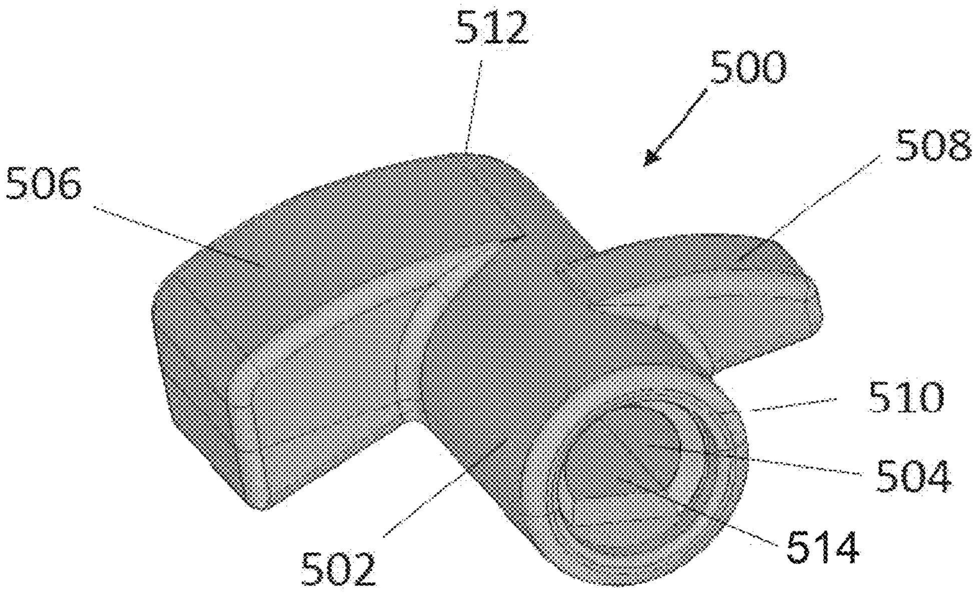
Fig. 13A
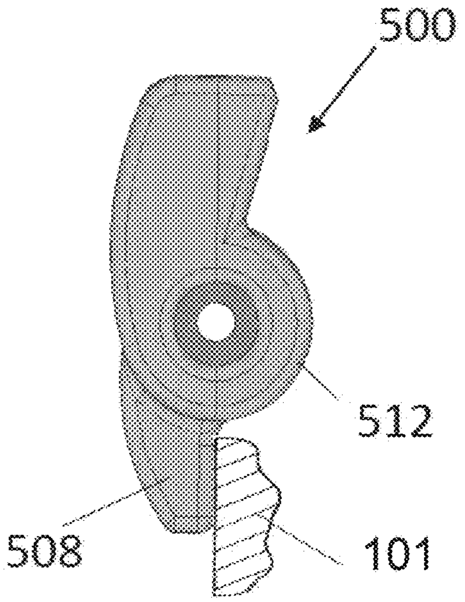
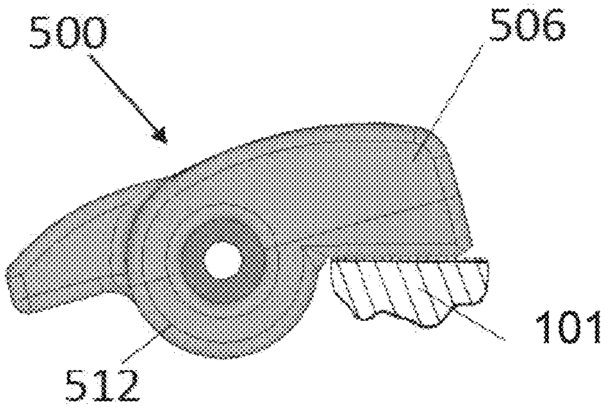
Fig. 13B
Fig. 13C

ELECTRICAL CONNECTOR WITH INTERLOCK

CROSS-REFERENCE TO RELATED APPLICATIONS

This application is based on and claims priority to U.S. Provisional Application Ser. No. 63/431,284 filed Dec. 8, 2022 entitled ELECTRICAL CONNECTOR WITH INTERLOCK the contents of which are incorporated herein in their entirety by reference.

BACKGROUND

Field

The present disclosure relates to electrical connectors and, in particular, to electrical connectors with interlocks.

Description of the Related Art

Various types of electrical connectors exist for interconnecting wires or cables. These electrical connectors generally include a female connector which can be joined to a male connector. In many operating environments, the male and female connectors can be made to attach and detach from each other in a relatively simple manner. For example, generally, the male connector includes prongs which are dimensioned and positioned in the male connector and are received in correspondingly dimensioned and positioned receptacles in the female connector. The male prongs and or the female receptacles may be dimensioned and designed to provide a snug secure fit which keep the male and female connectors together. However, the male and female connectors can generally be easily separated by pulling the male and female connectors apart.

In certain operating environments, it is important that the male and female connectors be joined in such a manner that it is not easy to connect and/or disconnect them. For example, when the cables being joined by the male and female connectors carry high voltages and/or currents, it may be ill-advised to connect and/or disconnect the connectors when power is applied to the cable, since arcing can occur. Such arcing can cause damage to the connectors and may present an issue for users connecting and/or disconnecting the connectors. In fact, even after power is removed from the cable, the cable and connectors may still maintain high levels of residual voltage/current which can be released in the form or arcing if the male and female connectors are disconnected too soon after power is removed. The user should not be able to join or separate the male and female connectors while power is supplied and/or immediately after power is removed to avoid this arcing condition.

An example of such a high voltage and/or high current operating environment involves the use of strong electromagnets. Electromagnets are used in many types of systems including, for example, Magnetic Resonance Imaging (MRI) machines, particle accelerators, magnetic separation and/or moving equipment, magnetic levitation, etc. just to name a few. These types of devices often operate at very high voltages and/or currents and require the utmost care be taken by the operators.

A need exists for connectors that can only be joined and disconnected when a voltage/current in the connector is at a level where arcing will not occur. In particular, the connectors should be capable of being joined and/or disconnected without the operator having to know when power is on and/or if or when power was removed.

SUMMARY

According to an illustrative embodiment of the present disclosure, an electrical connector includes at least one locking member movably engageable with at least one locking feature provided on a second electrical connector, at least one latch rotatably movable between a locked position for preventing movement of the at least one locking member and an unlocked position for allowing movement of the at least one locking member and a sensor for sensing a voltage level on the electrical connector, wherein when the voltage level is sensed to be above a defined level, the at least one latch is moved to the locked position and when the voltage level is sensed to be below the defined level the at least one latch is moved to the unlocked position.

According to another illustrative embodiment of the present disclosure, an electrical connector assembly includes a first electrical connector having at least one locking feature and a second electrical connector having at least one locking member movably engageable with the at least one locking feature, at least one latch rotatably movable between a locked position for preventing movement of the at least one locking member and an unlocked position for allowing movement of the at least one locking member and a sensor for sensing a voltage level on the second electrical connector, wherein when the voltage level is sensed to be above a defined level, the at least one latch is moved to the locked position and when the voltage level is sensed to be below the defined level the at least one latch is moved to the unlocked position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 7A-7C are cross-sectional views of an electrical connector according to illustrative embodiments of the present disclosure;

FIGS. 13A-13C are views of a cam member according to an illustrative embodiment of the present disclosure.

DETAILED DESCRIPTION

Illustrative embodiments of the present disclosure provide electrical connectors. More specifically, illustrative embodiments of the present disclosure provide high voltage/high current electrical connectors with one or more lockouts. While embodiments of the present disclosure may generally be described with respect to the use of DC systems, it will be appreciated aspects of the present disclosure may be applied to AC systems as well.

Figure 1A:
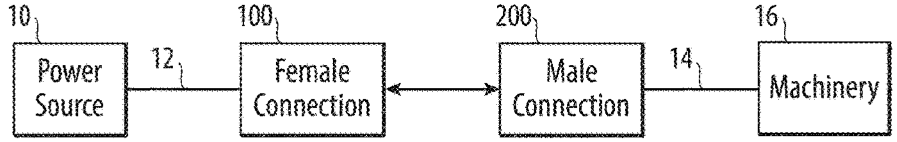
FIG. 1A is a block diagram for describing an electrical connector assembly according to an illustrative embodiment of the present disclosure.

As depicted in FIG. 1A, a high voltage and/or high current power source 10 provides power to female connector 100 via a cable 12. A corresponding male connector 200 may be connected, for example, to machinery 16 to be powered by cable 14. The user should not be able to connect or disconnect female connector 100 and male connector 200 until a voltage and/or current level in the connector is at a level where arcing will not occur. According to illustrative embodiments of the present disclosure, one or more lockout mechanisms are provided in at least one of the female and/or male connectors. The lockout mechanisms prevent the male and female connectors from being joined or separated until power is no longer being supplied by power source 10 and not until any residual voltage/current lingering in the connector(s) dissipates sufficiently to prevent arcing. For example, this voltage level could be close to zero volts or may be any suitable voltage level which is not likely to cause arcing when a user attempts to join or separate the connectors while still providing sufficient power to drive the lockout mechanisms as described herein. In particular, some standards define the voltage level or range which carries a low risk of dangerous electrical shock from arcing. This may be referred to as Safety Extra Low Voltage (SELV) and is generally considered to be around 25 Vac/60 Vdc. While these voltage levels may not guarantee no arcing will occur, any arcing that may occur is not likely to be at a level considered dangerous to a user. Cables 12, 14 may be any cable suitable for carrying high voltage and/or high current and may include one or more stranded or solid wires. Cables 12, 14 may each include a plurality of insulated wires.

Figure 1B:
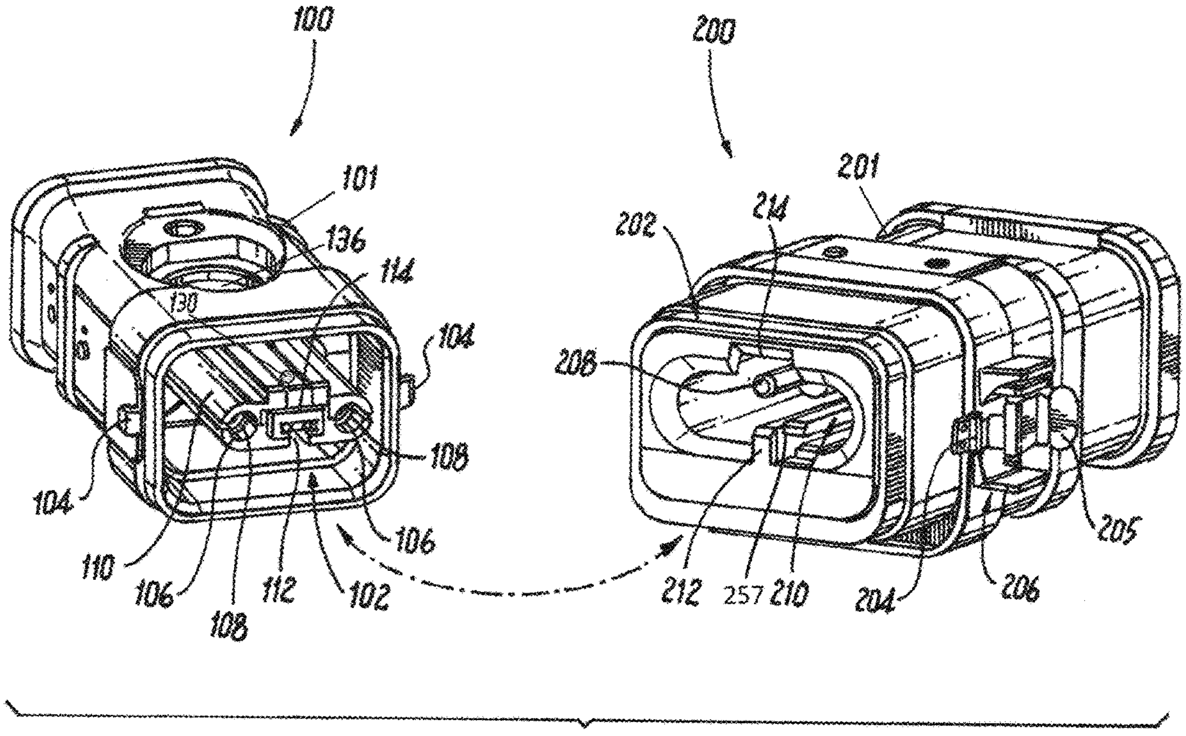
FIG. 1B are perspective views of electrical connectors according to illustrative embodiments of the present disclosure.

A female electrical connector 100 and a corresponding male electrical connector 200 according to exemplary embodiments of the present disclosure are shown in FIG. 1B. Female electrical connector 100 has a main housing 101 and male connector 200 has a main housing 201. Main housing 101 includes a receptacle 102 for receiving plug portion 202 of male electrical connector 200. Female electrical connector 100 also includes electrical contact housing 110 which is received in socket 210 of male connector 200. Electrical contact housing 110 includes a pair of orifices 106 having female electrical contacts 108 provided therein for receiving male contacts 208 (only one shown) extending into the interior of socket 210.

Electrical contact housing 110 includes a narrow notch 112 on one side of the electrical contact housing 110 and a relatively wide protrusion 114 on the other side. The male electrical connector 200 includes a narrow protrusion 212 along a wall of the inner surface of socket 210 which corresponds to the narrow notch 112 in electrical contact housing 110. As will be described later below, notch 112 includes a slide mechanism which forms a portion of a lockout for selectively preventing male electrical connector 200 and female electrical connector 100 from being connected. A relatively wide notch 214 is provided in the opposite wall of the inner surface of socket 210 which corresponds to the relatively wide protrusion 114 in electrical contact housing 110. The notches and corresponding protrusions act as key like structures so that the female electrical connector 100 and male electrical connector 200 can only be joined in one way. In addition, the notches and corresponding protrusions may be configured differently for different types of connectors (e.g., different voltage/current ratings, etc.). Male connector 200 may include a pair of draw latches 206 (only one shown) one on either side of the main housing 201. Each draw latch 206 includes a hook plate 204 and hinged lever 205. Main housing 101 of female connector 100 may include a corresponding pair of keepers 104, one on either side of the connector 100. When female electrical connector 100 and male electrical connector 200 are plugged together, hinged levers 205 are rotated to the vertical position and hook plates 204 are hooked to keepers 104. Hinged levers 205 are then rotated to their horizontal positions drawing the female electrical connector 100 and male electrical connector 200 together and are held in position by tension. Receptacle 102 and plug portion 202 may be dimensioned and configured to provide a watertight seal when female electrical connector 100 and male electrical connector 200 are attached together. Female electrical connector 100 includes a lock button 130 and a release button 136, the features of which will be described in more detail later below.

Figure 2A:
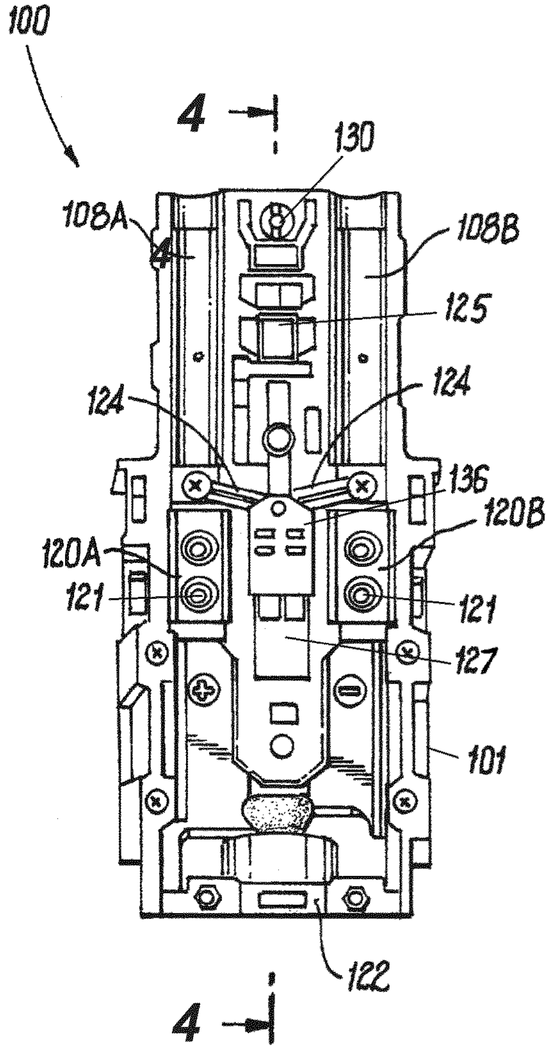
FIG. 2A is a top view of an electrical connector according to an illustrative embodiment of the present disclosure.
Figure 2B:
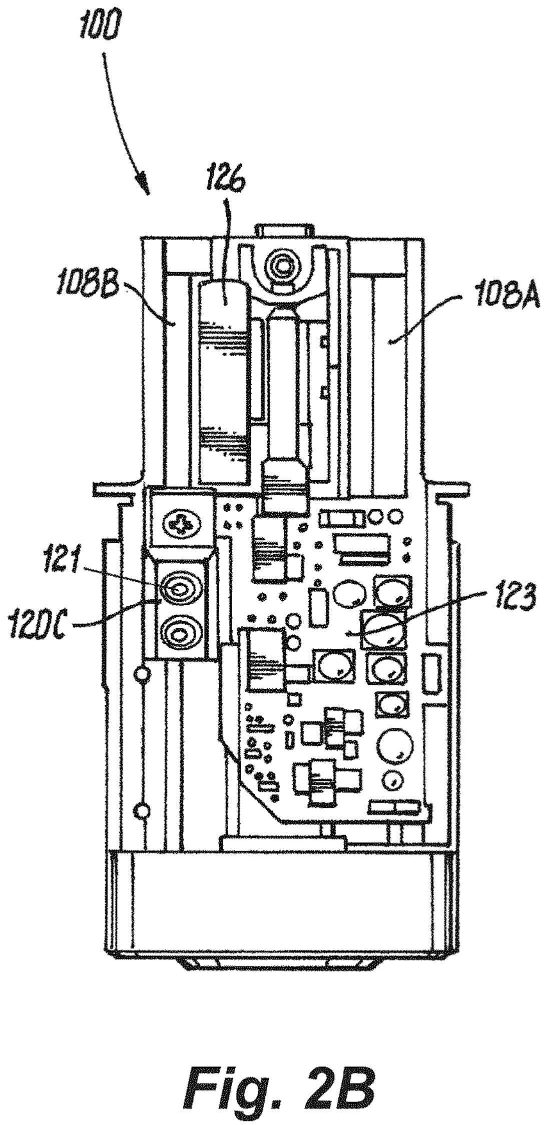
FIG. 2B is a bottom view of an electrical connector according to an illustrative embodiment of the present disclosure.

FIG. 2A depicts an upper view of the main housing 101 of female connector 100 (with a cover plate removed) according to an illustrative embodiment of the present disclosure. FIG. 2B depicts a lower view of the main housing 101 of female connector 100 (with a cover plate removed) according to an illustrative embodiment of the present disclosure. A proximal end of a high voltage power cable (e.g., cable 12, FIG. 1A) may be attached to female connector 100 utilizing cable restrainer 122. The power cable may include positive, negative, and ground wires (not shown). Connection block terminals 120A-120C which include set screws 121 are provided for attaching the positive, negative, and ground wires to female connector 100. For example, connection block terminal 120A receives the positive wire from the power cable and is electrically connected to a positive female electrical contact 108A. Connection block terminal 120B receives the negative wire from the power cable and is electrically connected to a negative female electrical contact 108B. Connection block terminal 120C receives the ground wire from the power cable and is electrically connected to a ground strip 126. The distal end of the power cable may generally be connected to a high voltage/high current source as described above with respect to FIG. 1A. An electrical control circuit board 123 is mounted to a bottom of female connector 100 as shown in FIG. 2B. Electrical control circuit board 123 receives power from jumpers 124 mounted to the connection block terminals 120A-120B. The electrical control circuit board 123 includes circuitry which may vary depending on the particular embodiment as will be described later below. Main housing 101 includes areas 125, 127 for receiving motors as will be described below for controlling lockout mechanisms associated with lock button 130 and release button 136.

Figure 3A:
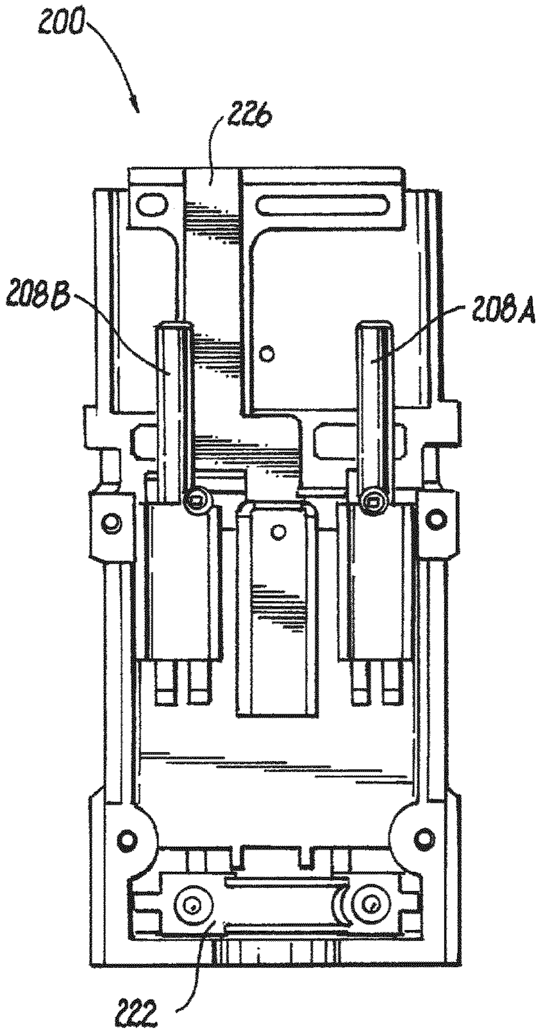
FIG. 3A is a top view of an electrical connector according to an illustrative embodiment of the present disclosure.
Figure 3B:
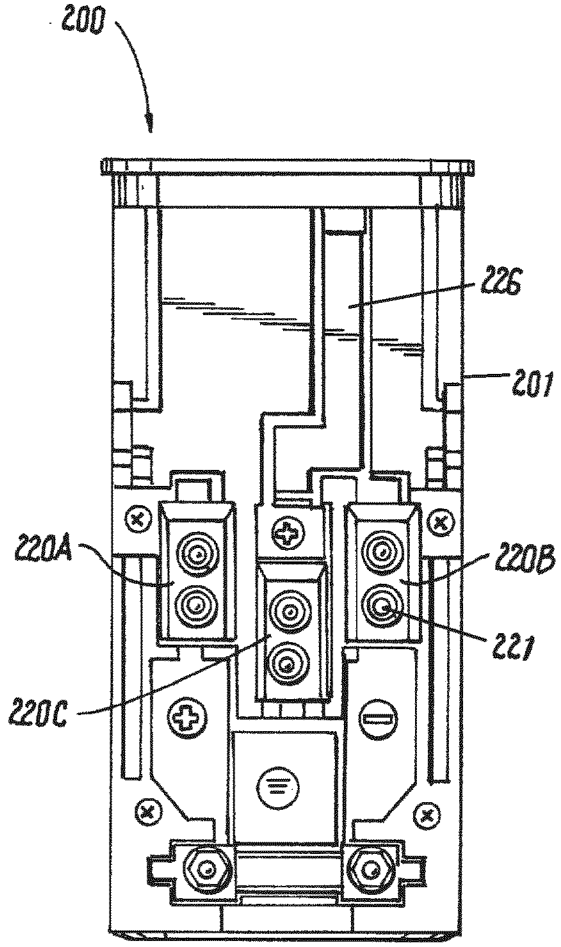
FIG. 3B is a bottom view of an electrical connector according to an illustrative embodiment of the present disclosure.

FIG. 3A depicts an upper view of the main housing 201 of male connector 200 (with a cover plate removed) according to an illustrative embodiment of the present disclosure. FIG. 3B depicts a lower view of the main housing 201 of male connector 200 (with a cover plate removed) according to an illustrative embodiment of the present disclosure. A proximal end of a high voltage/current power cable leading to a machine to be powered is attached to male connector 200 utilizing cable restrainer 222. The power cable may include positive, negative, and ground wires. Connector block terminals 220A-220C which include set screws 221 are provided for attaching the positive, negative, and ground wires to male connector 200. For example, connector block terminal 220A receives the positive wire from the power cable and is electrically connected to a positive male electrical contact 208A. Connector block terminal 220B receives the negative wire from the power cable and is electrically connected to a negative male electrical contact 208B. Connector block terminal 220C receives the ground wire from the power cable and is electrically connected to ground strip 226.

When female connector 100 and male connector 200 are plugged together, the positive male electrical contact 208A makes electrical contact with female electrical contact 108A, the negative male electrical contact 208B makes electrical contact with the negative female electrical contact 108B and ground strip 126 makes electrical contact with ground strip 226.

According to illustrative embodiments of the present disclosure as described herein, the male and female connectors include one or more interlocks configured so that the male and female connectors cannot be connected to or disconnected from each other while power is applied to the female connector or even when power has been removed and considerable voltage or current levels may still linger in the connector(s).

Figures 4A, 4B, 4C:
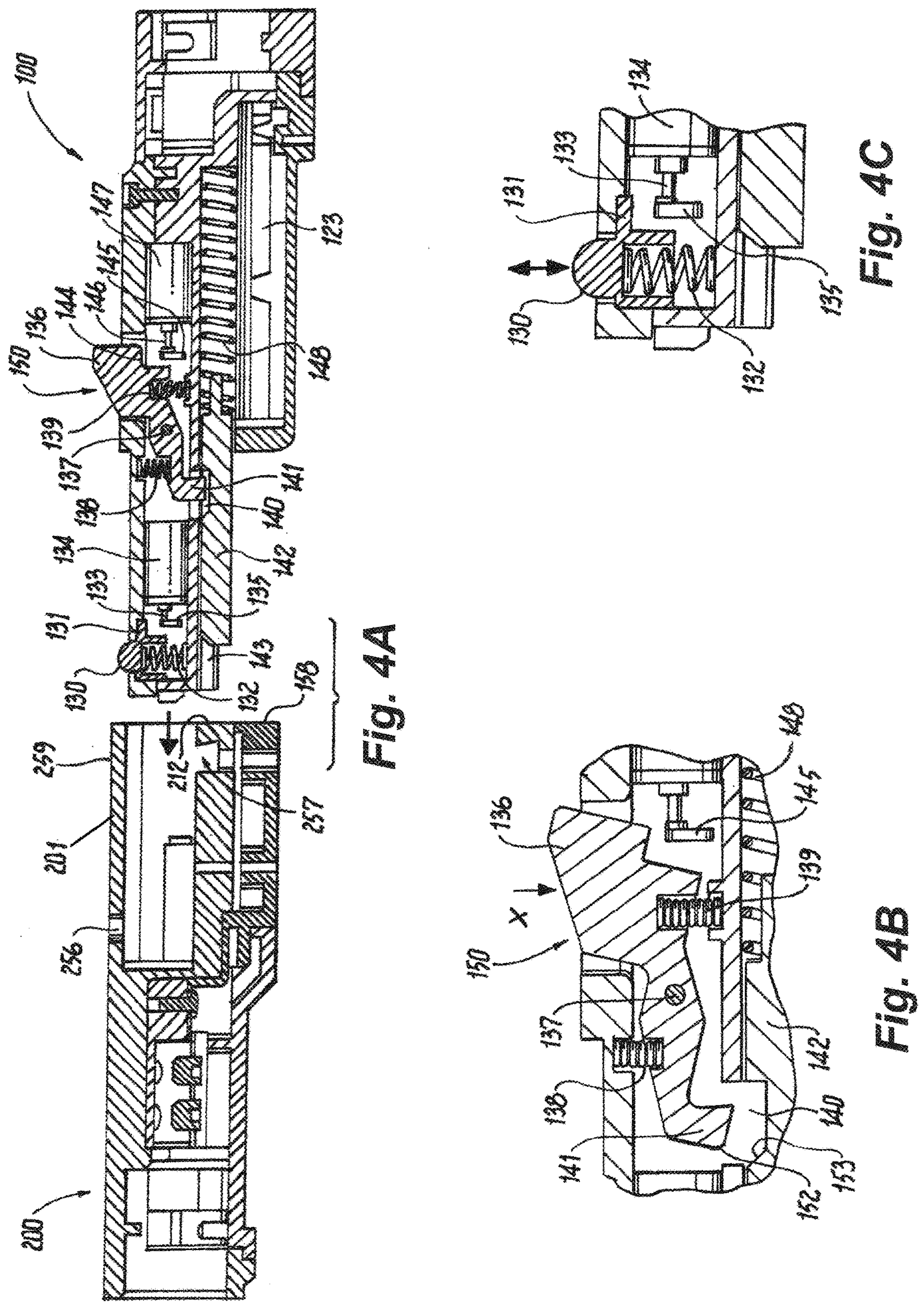
FIGS. 4A-4C are cross-sectional views of an electrical connector according to illustrative embodiments of the present disclosure.

An interlock mechanism according to an illustrative embodiment of the present disclosure is provided in the female connector 100 and is shown in cross-section in FIGS. 4A-4C. Illustrative embodiments of the present disclosure may utilize rotary type mechanisms for locking and unlocking the connectors and may be referred to herein simply as rotary mechanisms or motors. Non-limiting examples of rotary type mechanisms include DC motors, servos, steppers, generic gear motors, etc.

According to an illustrative embodiment of the present disclosure depicted in FIG. 4A-4C, an interlock system is provided for preventing the male connector 200 and female connector 100 from being joined or disconnected when power is supplied to the female connector 100 or when considerable residual voltage or current remains on the connector(s). Redundancy is provided in the form of two separate interlock mechanisms.

A first interlock mechanism according to an illustrative embodiment of the present disclosure includes a raised lock button 130 which extends from an upper surface of the main housing 101 of female connector 100. Button 130 includes an arm 131 extending therefrom and is biased in the raised position (as shown in FIGS. 4A, 4C) by spring 132. A motor 134 includes a cam member 135 extending from shaft 133. As will be described in further detail below, when cam 135 is in the position depicted in FIG. 4C, button 130 is free to be depressed. Button 130 may be depressed simply by a user pressing down on it. Alternatively, button 130 may be depressed as button 130 contacts housing 201 of the male connector 200 as the female connector 100 and the male connector 200 are being joined. However, as will be described in further detail below, when cam 135 is in an upright position, cam 135 contacts arm 131 of button 130, preventing button 130 from being depressed.

A second interlock mechanism according to an illustrative embodiment of the present disclosure includes a latch arm 150 which pivots about pivot point 137 and is normally biased in the position shown in FIG. 4A by springs 138, 139. Latch arm 150 includes a latch 141 which selectively engages a notch 140 in a slide mechanism 142 which slides along a rail 143. Slide mechanism 142 is biased in the position shown in FIG. 4A by spring 148. Latch arm 150 includes a release button 136 which extends or is accessible from the upper surface of female connector 100. A motor 147 includes a cam 145 extending from shaft 146. As will be described in further detail below, when cam 145 is in the position shown in FIG. 4B, latch arm 150 is free to rotate about pivot point 137 when release button 136 is pressed. However, when cam 145 is in an upright position, cam 145 contacts the lower side 144 of release button 136 preventing latch arm 150 from rotating.

The interlock mechanisms described herein can be in one of several states including an unlocked state, lockout state and interlocked state. The unlocked state is depicted in FIG. 4A and occurs when power is not being supplied to female connector 100. For example, power is not being supplied to the power cable to which female connector 100 is attached and any residual voltage or current remaining in the female connector 100 has dropped to a level at or below a level where arcing is likely to occur. In the unlocked state, cam member 135 is positioned such that button 130 can move up and down (e.g., see FIG. 4C) and cam member 145 is positioned such that latch arm 150 is capable of rotating about axis 137. That is, latch arm 150 is capable of rotating in the clockwise direction when force is applied to release button 136 in the X direction as shown in FIG. 4B. In addition, latch arm 150 will be urged in the clockwise direction when the male and female connecters are being connected. For example, protrusion 212 on male connector 200 will engage and urge slide mechanism 142 against the bias force of spring 132 as the lower edge 152 of latch 141 slides up inclined surface 153 of notch 140 until latch 141 engages into notch 257 in the male connector 200 (e.g., see FIG. 6). During this same time when the male and female connectors are being connected, button 130 extending from the female connector 100 is urged downward against the bias force of spring 132 by the upper surface 259 of male connector 200 until button 130 is received in the hole 256 provided in the male connector 200. In this unlocked state, the connectors can be easily separated by pressing down on button 136 which disengages latch 141 from notch 257 and pulling the male connector 200 and female connector 100 apart.

Figure 5A:
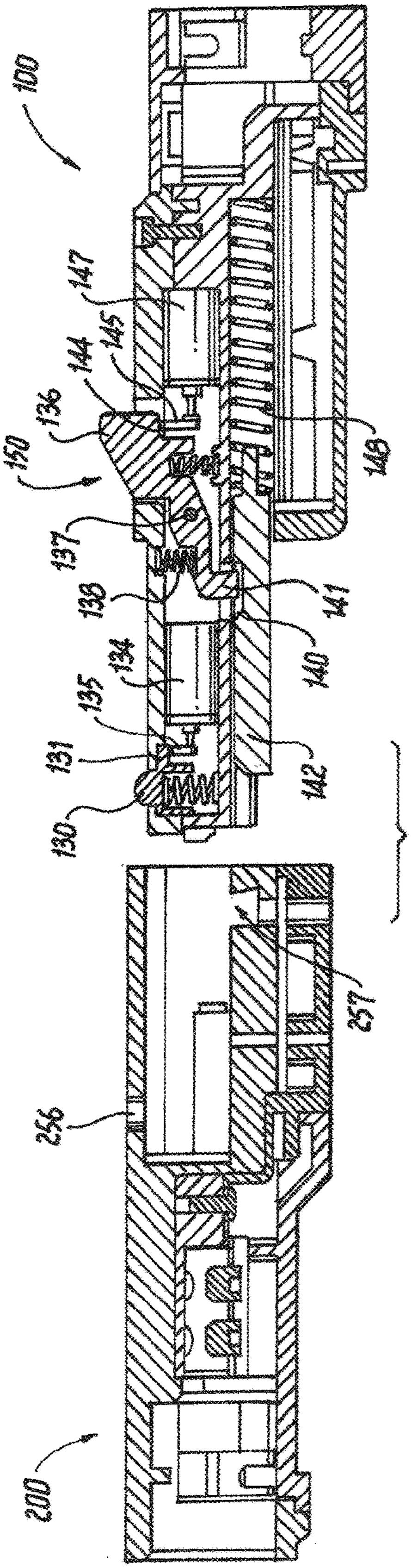
FIGS. 5A-5C are cross-sectional views of an electrical connector according to illustrative embodiments of the present disclosure.
Figure 5C:
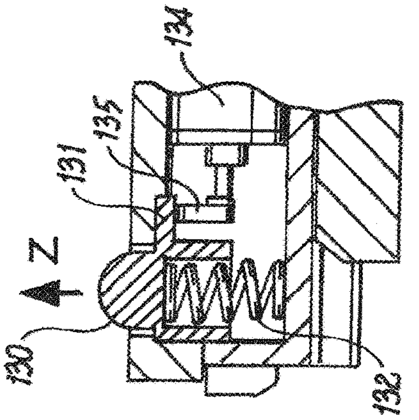
Figure 5B:
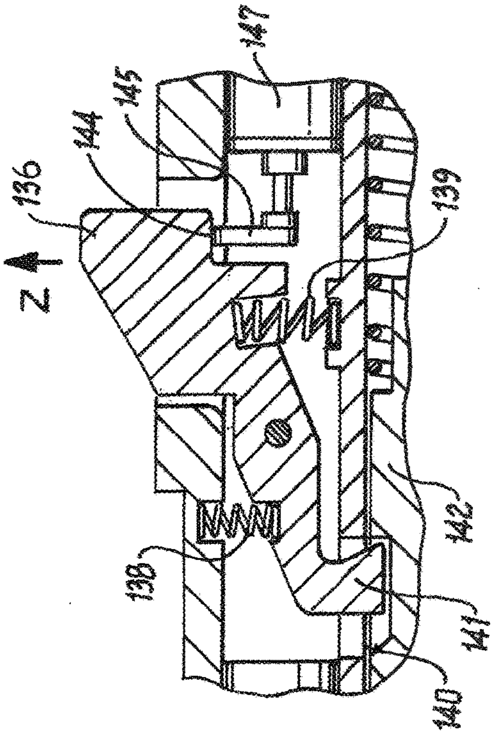

When power is applied to connector 100 or there is residual voltage or current in connector 100, the interlock mechanisms enter a second state which is shown in FIGS. 5A-5C and is referred to herein as a lockout state. When power is supplied to the female connector 100 and for a certain amount of time after power is removed from female connector 100 until the voltage and/or current dissipate sufficiently, the motors 134, 147 are controlled so that the cams 135, 145 are rotated to the positions shown in FIGS. 5A-5C. In this lockout state, cam 135 abuts the arm 131 extending from button 130 and thereby locks button 130 in the position shown in FIG. 5C. In addition, cam 145 abuts a lower surface 144 of button 136 locking latch arm 150 in position and preventing latch arm 150 from rotating. Accordingly, latch 141 is locked and remains engaged in notch 140 in slide mechanism 142 locking the slide mechanism 142 and preventing it from sliding. In this lockout state, locked button 130 and locked slide mechanism 142 prevent the female connector 100 and male connector 200 from being interconnected. The female connector 100 will remain in this lockout state until power is removed and any lingering voltage or current dissipates sufficiently to a level where arcing is not likely to occur. When power is removed and any lingering voltage or current dissipates sufficiently, the motors 134, 147 are controlled so that the cams 135, 145 are rotated to the positions or unlocked state shown in FIG. 4A.

The female connector 100 and male connector 200 may be joined when female connector 100 is in the unlocked state depicted in FIG. 4A. As noted above, as the female connector 100 and the male connector 200 are being pressed together, button 130 of female connector 100 will engage the upper portion 259 of male connector 200 and will be urged downward against the upward bias force of spring 132. In addition, the leading edge of protrusion 212 will engage and urge slide mechanism 142 back against the bias force of spring 148. When the female connector 100 and male connector 200 are completely seated together, button 130 will engage orifice 256 in male connector 200. In addition, latch 141 will engage notch 257 in male connector 200. At this time and before power is supplied to female connector 100, the connectors may be disengaged or unplugged from each other by pressing down on button 136 while gently pulling the female connector 100 and male connector 200 in opposite directions.

Figure 6:
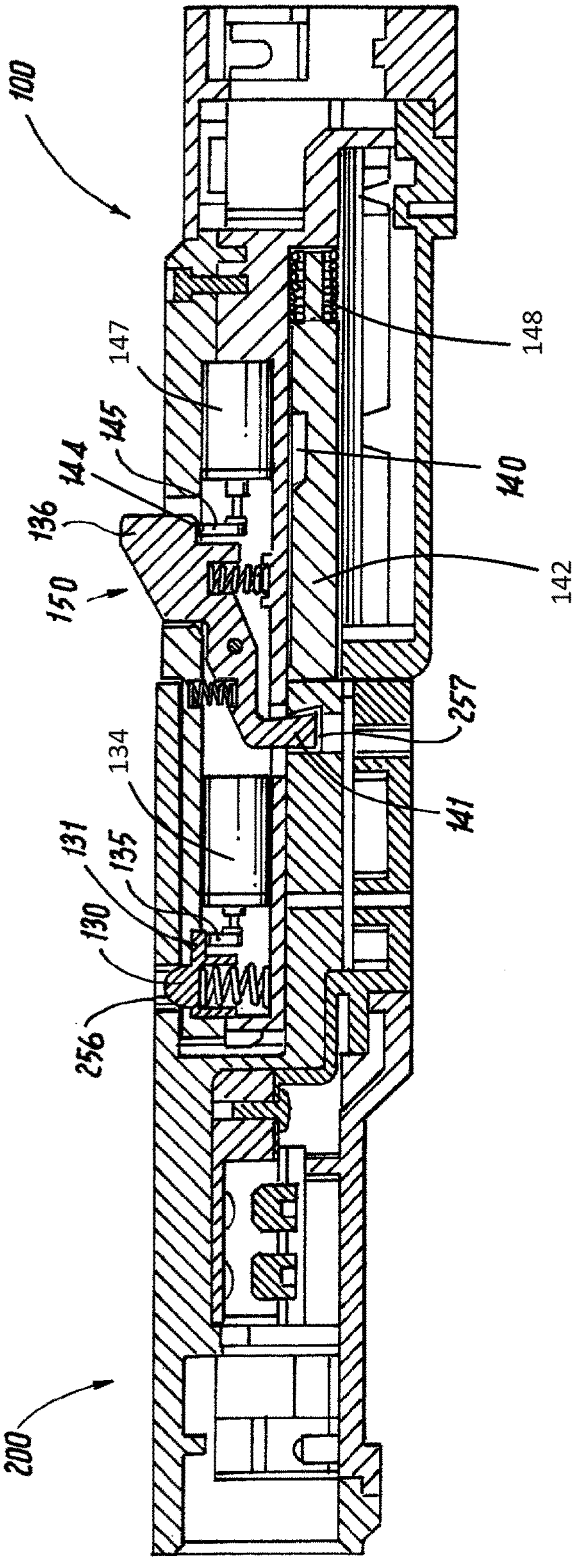
FIG. 6 is a cross-sectional view of an electrical connector according to an illustrative embodiment of the present disclosure.

When the female connector 100 and male connector 200 are fully engaged as shown in FIG. 6, and power is then applied, the motors 134, 147 are driven until cams 135 and 145 rotate (upward as shown in FIG. 6) into what is referred to herein as the interlock state. In the interlock state, cam 135 engages arm 131 preventing button 130, which is seated in the orifice 256 provided in male connector 200, from moving downward out of orifice 256. In addition, latch 141 of female connector 100 rests in notch 257 in male connector 200 and cam 145 abuts the lower surface 144 of button 136 locking latch arm 150 in position and preventing latch arm 150 from rotating. Accordingly, latch 141 remains engaged in notch 257 of male connector 200. In this interlock state, the female connector 100 and the male connector 200 cannot be separated until power is removed and any lingering voltage or current dissipates sufficiently to a level where arcing is not likely to occur. When power is removed and any lingering voltage or current dissipates sufficiently, the motors 134, 147 are driven so that cams 135, 145 rotate to the unlocked state shown in FIG. 4A. In the unlocked state, button 130 is able to move downward and out of orifice 256 and button 136 can be pressed, disengaging latch 141 from notch 257, allowing the connectors to be separated.

An interlock mechanism according to another illustrative embodiment of the present disclosure is depicted in FIGS. 7A-7C. According to this embodiment, a screw type mechanism is used to lock and release the lock mechanisms. The screw type mechanism includes a movable latch 302 which slides back and forth along a track 308 (which is mounted to or formed as a portion of main housing 101) as shown by arrow A (FIG. 7A). Latch 302 has a threaded orifice 310 which receives the screw shaft 304 extending from motor 306 (FIG. 7C). When the motor 306 is driven rotating screw shaft 304 in a first direction, latch 302 moves along the track 308 to the position depicted in FIG. 7A. In this position, an upper edge 312 of latch 302 engages the lower surface 144 of button 136, preventing button 136 from moving. When the motor 306 is driven rotating screw shaft 304 in the opposite direction, latch 302 retracts to the position depicted in FIG. 7B. In this position, button 136 is free to move. As noted above, motor 306 may be a DC motor, servo, stepper, generic gear motor, etc. Although only shown for one of the lockout mechanisms, the screw type mechanism may also be utilized in place of the rotary type mechanism 134 and cam 135 depicted in the above-described embodiments.

Various types of control circuitry may be used for controlling the lockout systems depicted in the illustrative embodiments described herein. The circuits may sense when the voltage/current on the female connector 100 may be at a level to cause arcing if the male and female connectors were connected or disconnected. In this situation, the motors are driven to lock and prevent the connectors from being connected or disconnected. When the voltage/current has dissipated sufficiently, the motors are driven to allow the connectors to be connected or disconnected.

Figure 8A:
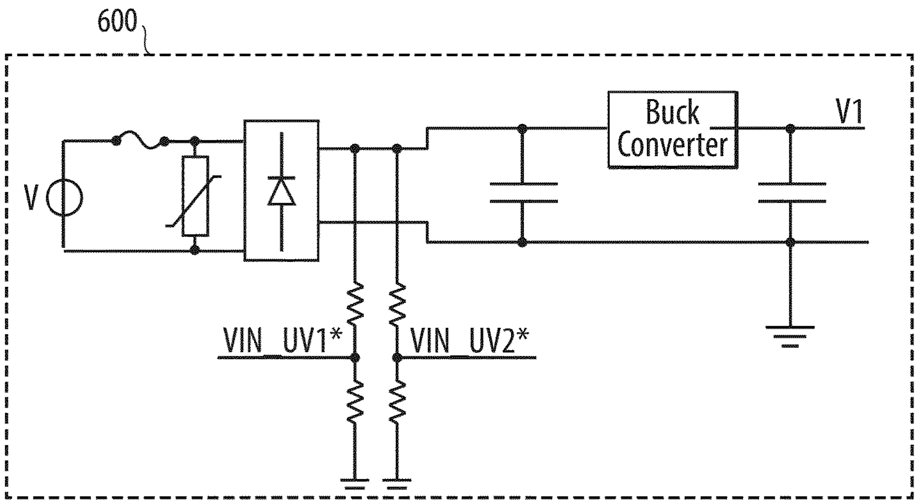
FIGS. 8A, 8B are block diagrams of power supply circuits according to illustrative embodiments of the present disclosure.

According to an illustrative embodiment of the present disclosure, a power supply 600 as shown in FIG. 8A may be used to reduce the high voltage input or supply voltage (AC or DC) V to one or more lower voltage levels suitable for powering the control circuitry and motors depicted in the illustrative embodiments described herein. As described above, the input or supply voltage is the voltage on the cable attached to the female connector. Although only one output voltage V1 is depicted, multiple voltage outputs (e.g., V2, V3, etc.) may be provided. For example, one or more different outputs may be provided, outputting the same voltages or different voltages as appropriate for the particular control circuitry described herein. These voltage outputs are supplied to control circuitry which controls the drive motors 134, 147, 306. For ease of discussion, the motors may be referred to herein as motors M1, M2. As noted above, the motors may be any suitable rotary type of device including, for example, DC motors, servos, steppers, generic gear motors, etc. The control circuitry may vary depending on the particular type of motors being driven. The power supply 600 may also provide one or more redundant signals (undervoltage signals VIN UV1* and VIN UV2*) which can be used by the control circuitry described herein to determine when overvoltage/undervoltage conditions occur so that the motors can be controlled accordingly. According to an illustrative embodiment of the present disclosure, more than two undervoltage signals may be supplied to provide extra redundancy.

Figure 8B:
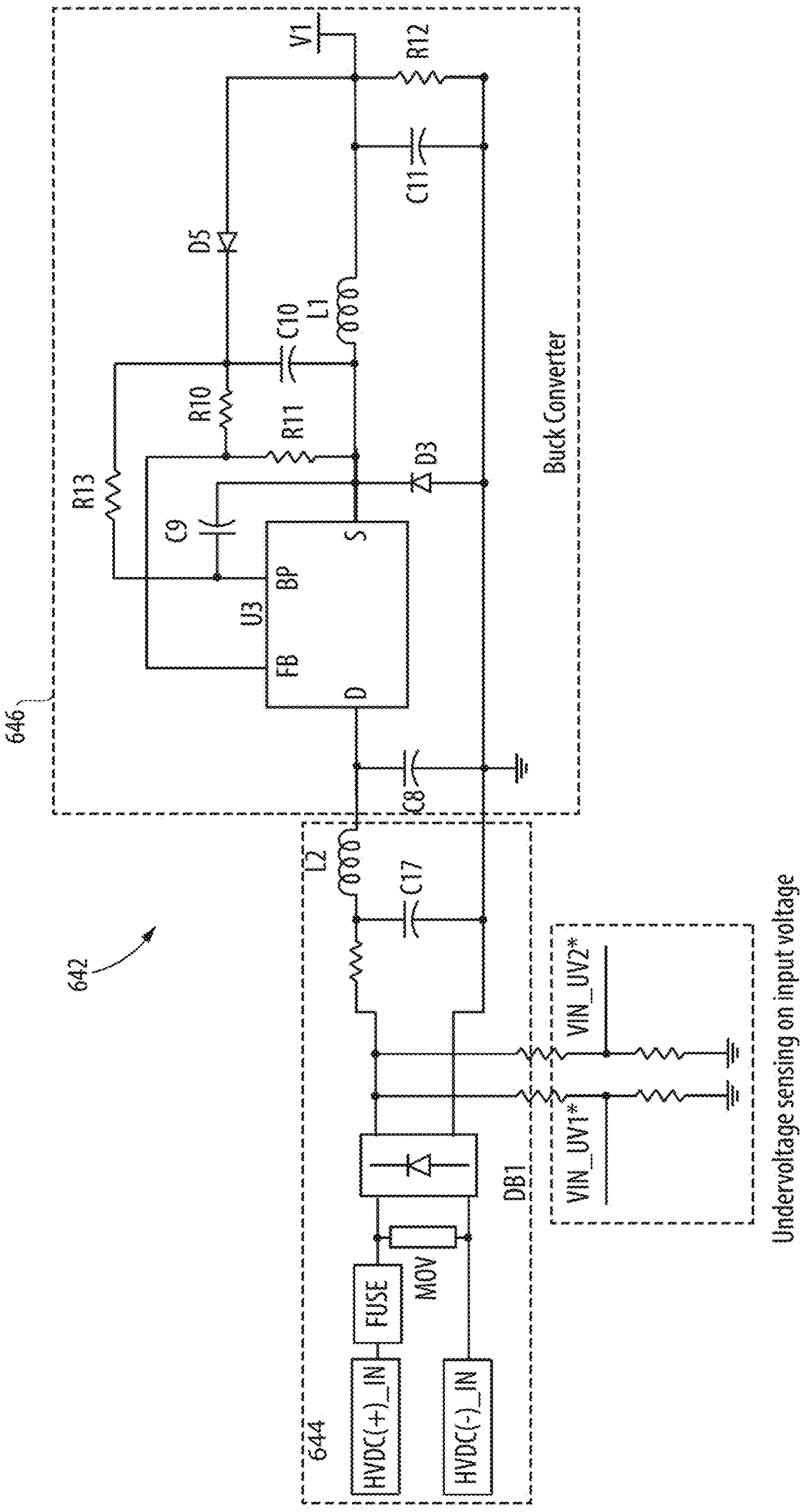

A more detailed drawing of a power supply according to an illustrative embodiment of the present disclosure is shown in FIG. 8B and is referred to as power supply 642. Power supply 642 takes the high voltage DC inputs to the female connector 100 and converts it to a level suitable for powering the control circuitry situated in the female connector 100. In particular, the front end 644 performs conditioning and surge protection of the high voltage input lines (HVDC(+)_IN and HVDC(−)_IN) and, along with buck converter 646, provides one or more regulated output voltages V1 suitable for powering the control circuitry. One or more undervoltage line signals VIN UV1* and VIN UV2* are also provided by power supply 642.

Figure 9:
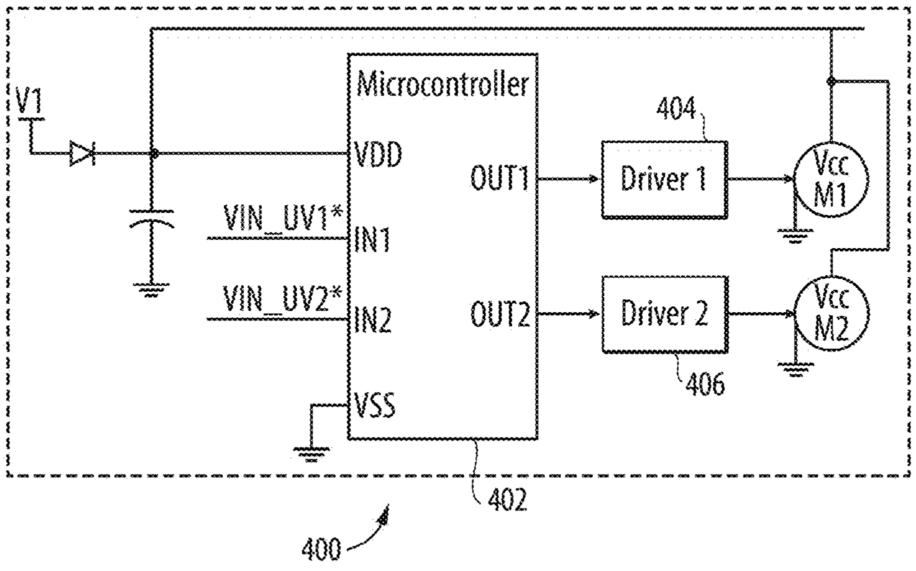
FIG. 9 is a block diagram of a circuit for controlling motors according to an illustrative embodiment of the present disclosure.

Control circuitry for controlling motors M1, M2 according to an illustrative embodiment of the present disclosure is shown in FIG. 9 and is referred to herein as control circuitry or just circuitry 400. The undervoltage line signals VIN UV1* and VIN UV2* provided by power supply 642 are monitored by microcontroller 402 to determine the condition of the line voltage V (e.g., (HVDC(+)_IN and HVDC(−)_IN) (e.g., see FIG. 8A). That is, utilizing one or both of the undervoltage line signals, the microcontroller 402 can determine if supply voltage V (HVDC(+)_IN and HVDC(−)_IN) is below (and/or above) a predefined voltage level. For example, according to an illustrative embodiment, this predefined voltage level is set at a value which is considered to be low enough that the male and female connectors can be connected or disconnected without arcing occurring. According to an illustrative embodiment of the present disclosure, the microcontroller 402 can be programmed so that it will not unlock the female connector until either one or both of the undervoltage line signals VIN UV1* and VIN UV2* drops below the predefined voltage level. As noted above, when power is removed from female connector 100, the voltage/current on the connector does not immediately go to zero. That is, a residual voltage/current may remain on the connector for a period of time until it naturally dissipates. Accordingly, an undervoltage condition will occur only when power to female connector 100 has been removed and a sufficient amount of time has passed for residual voltage/current to dissipate sufficiently. Microcontroller 400 monitors redundant undervoltage line signals VIN UV1* and VIN UV2* and when one (or both) drops below the predefined voltage, controls motors M1 and M2 accordingly as described above, utilizing drivers 404, 406. Drivers 404, 406 include control circuitry for amplifying the signals from microcontroller 400 and controlling the motors M1 and M2 accordingly. The power supply and control circuitry described herein may be provided on one or more circuit boards (e.g., circuit board 123, FIG. 2B) attached to and housed within female connector 100 (see FIG. 2B) and receive power from the power cable connected to female connector 100.

Figure 10A:
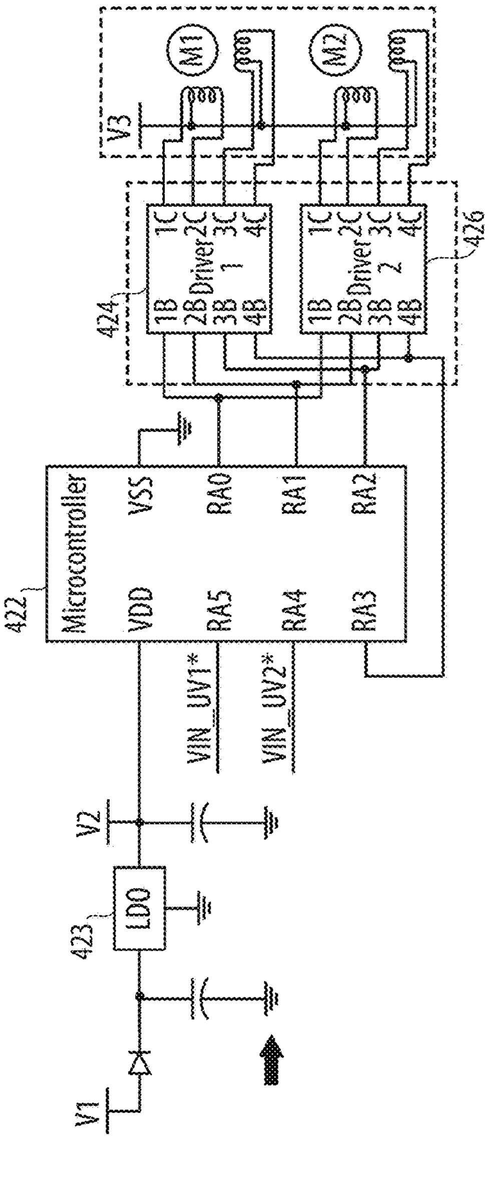
FIG. 10A is a block diagram of a circuit for controlling unipolar stepper motors according to an illustrative embodiment of the present disclosure.

As described above, stepper motors may be used in illustrative embodiments of the present disclosure. According to the present illustrative embodiment, the stepper motors M1 and M2 may be unipolar or bipolar. An example of control circuitry for controlling unipolar stepper motors is depicted in FIG. 10A. Power to the control circuitry is regulated utilizing a low dropout voltage regulator 423. Microcontroller 422 monitors redundant undervoltage signals VIN UV1* and VIN UV2* and controls motor M1 utilizing driver 424 and motor M2 utilizing driver 426. Drivers 424, 426 may include control circuitry for amplifying the signals from microcontroller 422 and controlling the unipolar stepper motors M1 and M2 accordingly.

Figure 10B:
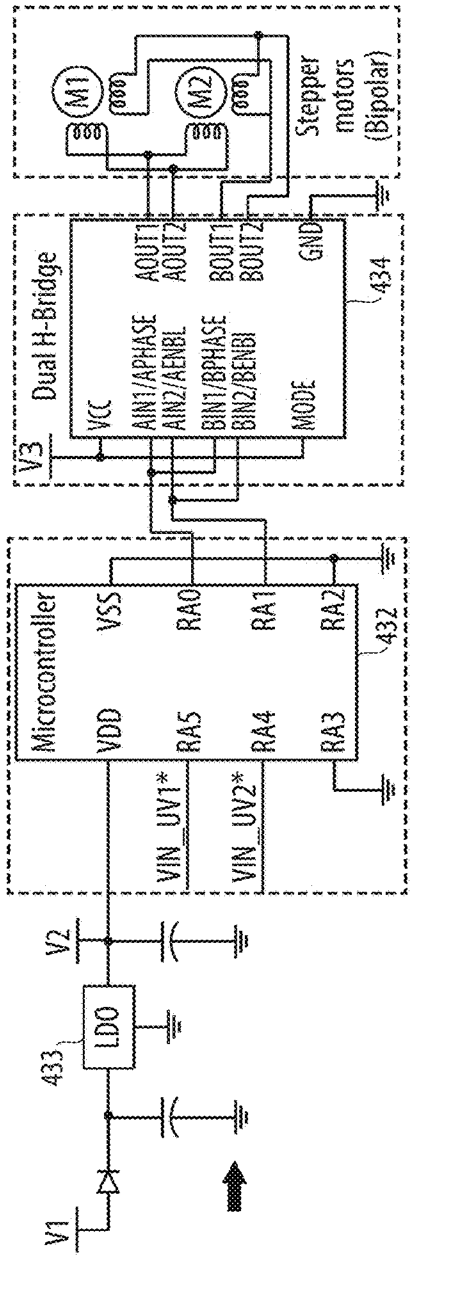
FIG. 10B is a block diagram of a circuit for controlling bipolar stepper motors according to an illustrative embodiment of the present disclosure.

An example of control circuitry for controlling bipolar stepper motors utilizing a dual H-bridge is depicted in FIG. 10B. Power to the control circuitry may be regulated utilizing a low dropout voltage regulator 433. Microcontroller 432 monitors the states of redundant undervoltage signals VIN UV1* and VIN UV2* and controls the bi-polar stepper motors M1 and M2 utilizing a Dual H-Bridge 434 which includes circuitry for amplifying the signals from microcontroller 432 and controlling the bipolar stepper motors M1 and M2.

Figure 11:
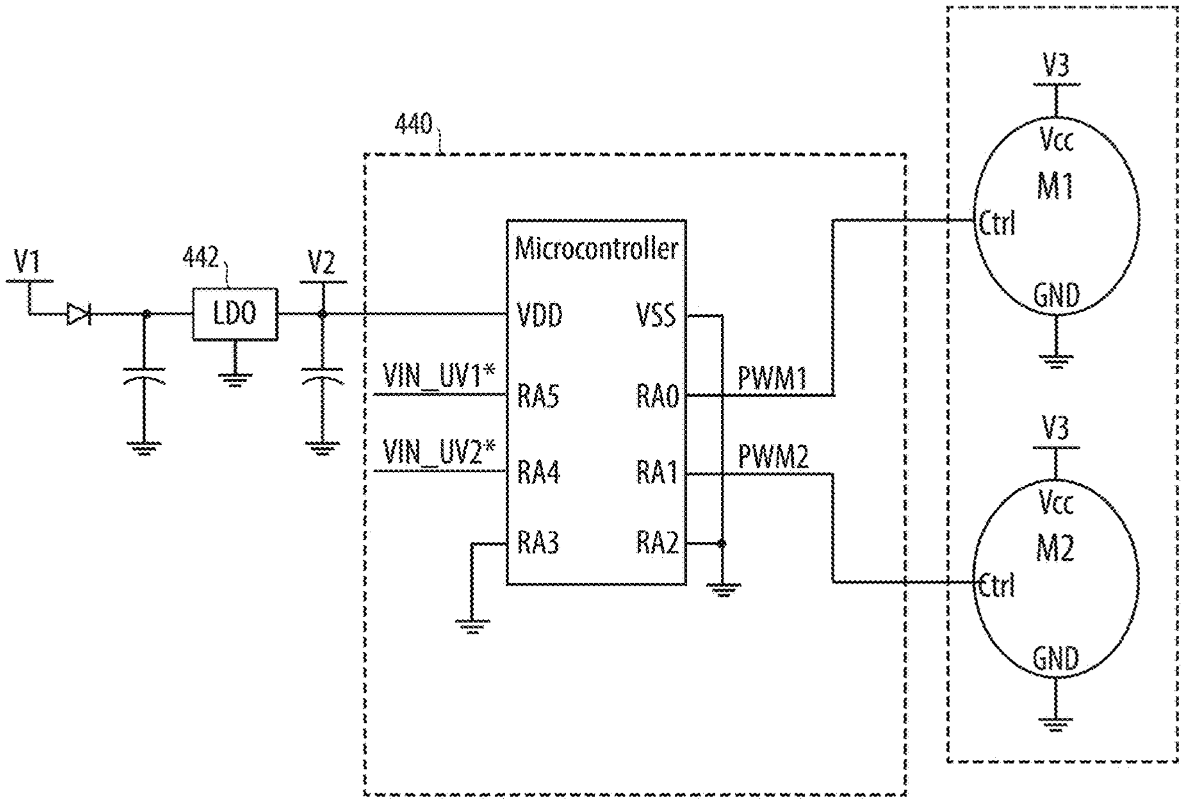
FIG. 11 is a block diagram of a circuit for controlling servos according to an illustrative embodiment of the present disclosure.
Figure 12:
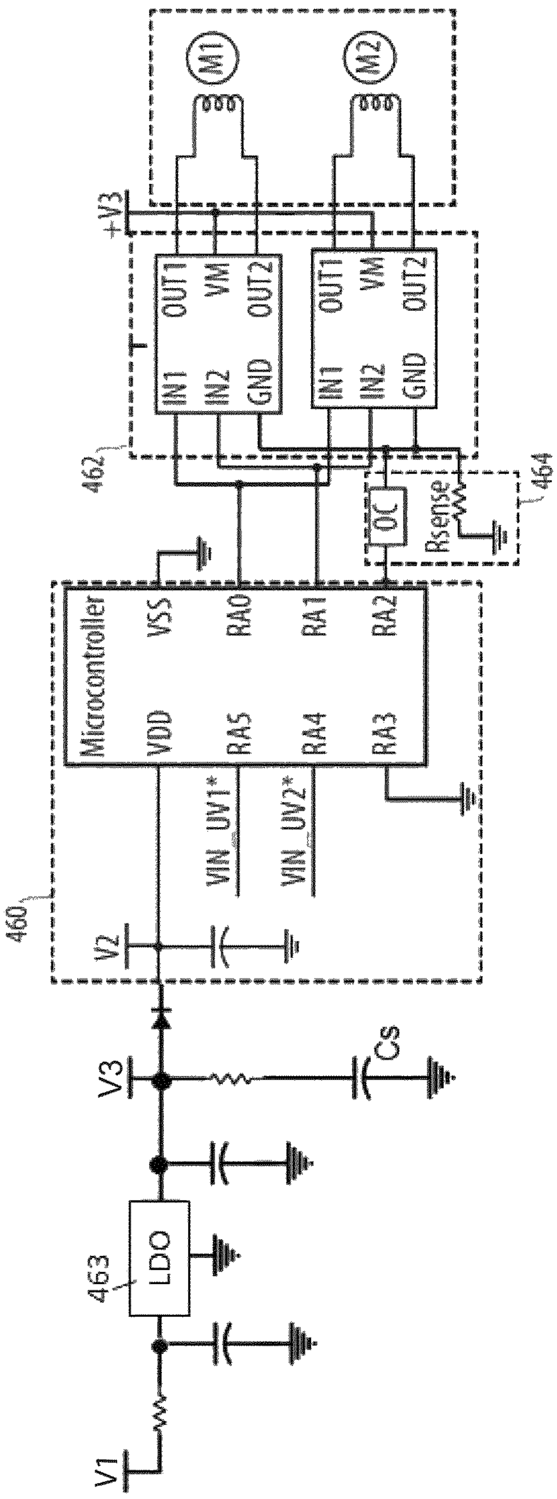
FIG. 12 is a block diagram of a circuit for controlling DC gear motors according to an illustrative embodiment of the present disclosure.

An example of control circuitry for controlling servo motors is depicted in FIG. 11. Power to the control circuitry is regulated utilizing a low dropout voltage regulator 442. Microcontroller 440 monitors the states of redundant undervoltage signals VIN UV1* and VIN UV2* and directly controls servo motors M1, M2 accordingly. It will be readily understood by those skilled in the art that several (e.g., four) 555 timers may be utilized in lieu of the microcontroller in any of the presently described embodiments if desired. According to another illustrative embodiment, motors M1, M2 may be DC gear motors. Control circuitry for controlling DC gear motors according to an illustrative embodiment of the present disclosure is depicted in FIG. 12. Power to the control circuitry may be regulated utilizing a low dropout voltage regulator 463. It will be appreciated by those skilled in the art that the use of one or more supercapacitors (Cs) also known as ultracapacitors which act as temporary energy storage devices may be desirable in the design of control circuitry described herein. Microcontroller 460 monitors the states of redundant undervoltage signals VIN UV1* and VIN UV2* and controls DC gear motors M1, M2 via DC motor drivers 462. When a DC gear motor is physically restrained from rotating, an overcurrent situation occurs. Feedback to microcontroller 460 is provided in the form of overcurrent detection circuitry 464 which effectively signals to microcontroller 460 when the motor (M1 and/or M2) has hit a mechanical stop so that the motor can stop being driven.

An example of a mechanical stop is shown in FIGS. 13A-13C in the form of cam 500. According to an illustrative embodiment of the present disclosure, cams 500 may replace cams 135 and 145 depicted and described above with respect to earlier embodiments. Cam 500 includes a main shaft 502 having a proximal end 510 and a distal end 512. Cam 500 includes a first cam extension 506 and a second cam extension 508 extending from shaft 502. A bore 504 extends through at least a portion of shaft 502. As depicted in FIG. 13A, at least a proximal end portion of bore 504 may be keyed with a flat inner surface 514 to receive a corresponding keyed shaft (133, 146) of the drive motors (134, 147). When power to female connector 100 is provided, microcontroller 460 controls the drive motors 134, 147 via motor drivers 462 to rotate shafts 133, 146 in the counter-clockwise direction. When cams 500 are rotated in the counter-clockwise direction to the locked position depicted in FIG. 13B, second cam extension 508 contacts a portion of main housing 101 preventing further counter-clockwise rotation of cam 500. Overcurrent detection circuitry 464 detects the overcurrent which occurs at this time and microcontroller 460 stops rotation of the shaft 133, 146. In this locked position, first cam extension 506 of the cam 500 attached to motor 147 is positioned to abut a lower surface 144 of button 136 (e.g., see FIG. 4B) locking latch arm 150 in position and preventing latch arm 150 from rotating. First cam extension 506 of the cam 500 attached to motor 134 is positioned to abut the lower surface of arm 131 (e.g., see FIG. 4C) preventing button 130 from being depressed. When power is removed to female connector 100 and any lingering voltage or current dissipates sufficiently, microcontroller 460 controls drive motors 134, 147 via motor drivers 462 to rotate shafts 133, 146 in the clockwise direction. When cams 500 rotate clockwise to the unlocked position shown in FIG. 13C, first cam extensions 506 contact a portion of main housing 101 preventing further clockwise rotation of cams 500. If sufficient residual power remains on female connector 100 at this time to power the control circuitry, microcontroller 460 will sense the over-current which occurs to the drive motors and microcontroller 460 will stop rotation of the drive shafts of motors 134, 147. Otherwise, if sufficient residual power does not remain, rotation of the drive shafts will stop on themselves for lack of power, leaving cams 500 in the unlocked position. In this unlocked position, latch arm 150 is free to rotate and button 130 can be depressed.

The electrical connector housings 101, 201 may be made from any suitable type of materials including plastics, rubbers, ceramics etc. The terminals, connectors, screw lugs, etc. may be made from any suitable type of conductive material as desired. Although the lock mechanisms are described herein as being provided in the female connector, it will be appreciated that depending on the particular application, it may be preferable to provide the lock mechanisms in the male connector. Alternatively, it may be preferable to provide one or more lock mechanisms as described herein in both the female and male connectors. The illustrative embodiments described herein may be utilized for DC as well as AC systems as desired.

Certain terminology may be used in the present disclosure for ease of description and understanding. Examples include the following terminology or variations thereof: top, bottom, up, upward, upper inner, outer, outward, down, downward, upper, lower, right, left, vertical, horizontal, etc. These terms refer to directions in the drawings to which reference is being made and not necessarily to any actual configuration of the structure or structures in use and, as such, are not necessarily meant to be limiting.

As shown throughout the drawings, like reference numerals designate like or similar corresponding parts. While illustrative embodiments of the present disclosure have been described and illustrated above, it should be understood that these are exemplary of the disclosure and are not to be considered as limiting. Various portions of the described embodiments may be mixed and matched depending on a particular application. Additions, deletions, substitutions, and other modifications can be made without departing from the spirit or scope of the present disclosure. Accordingly, the present disclosure is not to be considered as limited by the foregoing description.

What is claimed is:

1. An electrical connector comprising:
- at least one locking member movably engageable with at least one locking feature provided on a second electrical connector;
- at least one latch rotatably movable between a locked position for preventing movement of the at least one locking member and an unlocked position for allowing movement of the at least one locking member; and
- a sensor for sensing a voltage level on the electrical connector,
- wherein when the voltage level is sensed to be above a defined level, the at least one latch is moved to the locked position and when the voltage level is sensed to be below the defined level the at least one latch is moved to the unlocked position.

2. The electrical connector according to claim 1, wherein when the at least one latch is in the lock position, it is not possible to disconnect or connect the electrical connector and the second electrical connector.

3. The electrical connector according to claim 1, wherein the sensor senses a voltage level of a voltage being provided to the electrical connector, the defined level being a voltage level where arcing is not likely to occur when the electrical connector and the second electrical connector are connected or disconnected.

4. The electrical connector according to claim 1, wherein the sensor senses a residual voltage on the electrical connector when the voltage is not being provided to the electrical connector.

5. The electrical connector according to claim 1, wherein the at least one latch comprises at least one of a DC motor, servo, stepper and generic gear motor.

6. The electrical connector according to claim 5, wherein the at least one latch further comprises at least one of a rotatable cam member and a screw-driven latch plate.

7. The electrical connector according to claim 1, wherein the at least one locking member comprises a slide mechanism movable between first and second positions.

8. The electrical connector according to claim 7, wherein when the at least one latch is in the locked position, the slide mechanism is prevented from moving between the first and second positions and when the at least one latch is in the unlocked position, the slide mechanism is free to move between the first and second positions.

9. The electrical connector according to claim 1, wherein the at least one locking member comprises a button movable between first and second positions.

10. The electrical connector according to claim 9, wherein when the at least one latch is in the locked position, the button is prevented from moving between the first and second positions and when the at least one latch is in the unlocked position, the button is free to move between the first and second positions.

11. The electrical connector according to claim 10, wherein the at least one latch comprises two latches.

12. An electrical connector assembly comprising:
- a first electrical connector comprising,
  - at least one locking feature; and
- a second electrical connector comprising,
  - at least one locking member movably engageable with the at least one locking feature,
  - at least one latch rotatably movable between a locked position for preventing movement of the at least one locking member and an unlocked position for allowing movement of the at least one locking member, and
- a sensor for sensing a voltage level on the first electrical connector,
- wherein when the voltage level is sensed to be above a defined level, the at least one latch is moved to the locked position and when the voltage level is sensed to be below the defined level the at least one latch is moved to the unlocked position.

13. The electrical connector assembly according to claim 12, wherein when the at least one latch is in the lock position, it is not possible to disconnect or connect the first electrical connector and the second electrical connector.

14. The electrical connector assembly according to claim 12, wherein the sensor senses a voltage level of a voltage being provided to the second electrical connector, the defined level being a voltage level where arcing is not likely to occur when the first electrical connector and the second electrical connector are connected or disconnected.

15. The electrical connector assembly according to claim 12, wherein the sensor senses a residual voltage on the second electrical connector when the voltage is not being provided to the second electrical connector.

16. The electrical connector assembly according to claim 12, wherein the at least one latch comprises at least one of a DC motor, servo, stepper and generic gear motor.

17. The electrical connector assembly according to claim 16, wherein the at least one latch further comprises at least one of a rotatable cam member and a screw-driven latch plate.

18. The electrical connector assembly according to claim 12, wherein the at least one locking member comprises a slide mechanism movable between first and second positions.

19. The electrical connector assembly according to claim 18, wherein when the at least one latch is in the locked position, the slide mechanism is prevented from moving between the first and second positions and when the latch is in the unlocked position, the slide mechanism is free to move between the first and second positions.

20. The electrical connector assembly according to claim 12, wherein the at least one locking member comprises a lock button movable between first and second positions.

21. The electrical connector assembly according to claim 20, wherein when the at least one latch is in the locked position, the lock button is prevented from moving between the first and second positions.

* * * * *